(12) United States Patent
Kawai

(10) Patent No.: US 7,605,972 B2
(45) Date of Patent: Oct. 20, 2009

(54) ELECTRO-OPTICAL PANEL, ELECTRO-OPTICAL DEVICE, DRIVING METHOD OF ELECTRO-OPTICAL DEVICE

(75) Inventor: Hideyuki Kawai, Suwa (JP); Andrea Kurrer, legal representative, Fujimi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/954,068

(22) Filed: Dec. 11, 2007

(65) Prior Publication Data

US 2008/0174851 A1     Jul. 24, 2008

(30) Foreign Application Priority Data

Dec. 12, 2006   (JP)   ............... 2006-334449

(51) Int. Cl.
  *G02B 26/00* (2006.01)
  *G02F 1/03* (2006.01)
(52) U.S. Cl. ....................... 359/296; 359/245
(58) Field of Classification Search .......... 359/296
   See application file for complete search history.

(56) References Cited

U.S. PATENT DOCUMENTS

| 6,967,762 | B2 | 11/2005 | Machida et al. | |
| 2005/0111075 | A1* | 5/2005 | Kaneko et al. | 359/296 |
| 2005/0286116 | A1* | 12/2005 | Kanbe | 359/296 |
| 2006/0126154 | A1* | 6/2006 | Kanbe | 359/296 |
| 2007/0133080 | A1* | 6/2007 | Shikina et al. | 359/296 |
| 2008/0136773 | A1* | 6/2008 | Kim et al. | 345/107 |

FOREIGN PATENT DOCUMENTS

| JP | 62-269124 | 11/1987 |
| JP | 2000-035598 | 2/2000 |
| JP | 2001-290444 | 10/2001 |
| JP | 2002-511607 | 4/2002 |
| JP | 2003-195363 | 7/2003 |
| JP | 2005-3964 | 1/2005 |

\* cited by examiner

*Primary Examiner*—Jordan M. Schwartz
*Assistant Examiner*—James C Jones
(74) *Attorney, Agent, or Firm*—Harness, Dickey & Pierce, P.L.C.

(57) ABSTRACT

An electro-optical panel includes a first substrate, a second substrate facing the first substrate, a common electrode disposed on the first substrate, a plurality of pixel electrodes disposed on the second substrate, and a liquid dispersion medium which is sealed between a pair of substrates including the first substrate and the second substrate and into which charged particles are dispersed, in which the charged particles include first particles having a first color and second particles having a second color and having been charged to have a polarity different from a polarity of the first particles, the liquid dispersion medium has a third color, each of the plurality of pixel electrodes includes a plurality of sub-electrodes, and a voltage applying unit is provided so as to individually apply a voltage to the plurality of sub-electrodes.

8 Claims, 11 Drawing Sheets

ELECTRO-OPTICAL PANEL, ELECTRO-OPTICAL DEVICE, DRIVING METHOD OF ELECTRO-OPTICAL DEVICE

BACKGROUND

1. Technical Field

The present invention relates to an electro-optical panel, an electro-optical device, and a driving method of an electro-optical device.

2. Related Art

There is known an electrophoretic phenomenon in which charged particles dispersed in move migrate by an electric field. Further, there is known an application of this phenomenon, in which charged pigment particles disperse into dispersion liquid colored by a dye, the charged pigment particles in the colored dispersion liquid is interposed between a pair of electrodes, and the charged pigment particles migrate and stick to any one electrode of the pair of electrodes. Accordingly, there have been attempts to realize a display body (electro-optical panel) based on this phenomenon.

For example, JP-A-62-269124 discloses an electrophoretic device having a structure in which electrophoretic dispersion liquid containing two kinds of electrophoretic particles having different color tones and liquid dispersion medium is interposed between a pair of electrodes. In such an electrophoretic device, if a potential is supplied across the electrodes, the particles move in a direction of an electric field toward any one electrode of the pair of electrodes and thus a color based on a color of the particles move to a displaying surface is displayed on the observer side. That is, one of the electrodes is divided into a plurality of pixel electrodes and move of the particles toward the each pixel electrode is properly controlled. Accordingly, it is possible to display an image (pattern) corresponding to the controlled pixel electrodes.

However, such a method has a disadvantage in that it is possible to express only two kinds of color tones, such as white and black.

As for the electrophoretic device, JP-A-2000-035598 discloses a color displaying method which can display a color image as well as two kinds of color tones, such as black and white. In this method, three kinds of microcapsules, each including electrophoretic particles and a dispersion medium colored by any one of predetermined three primary colors, are arranged on a substrate in a predetermined arranging manner. The three kinds of microcapsules are discerned on the basis of colors of the dispersion media. The colors of the microcapsules are individually controlled and thus it is possible to realize a color display.

However, according to this method, it is possible to express black by performing a subtractive color process, and thus it is possible to express black having a sufficiently low reflectivity. Further, it is impossible to individually express the grayscale by every microcapsule.

JP-A-2001-290444 discloses a color correcting method which compensates a difference between a color of particles and a color of a dispersion medium.

However, this method also has a disadvantage in that it can express only two kinds of color tones and it cannot express the grayscale.

JP-T-2002-511607 discloses a method of realizing a color display. According to this method, three kinds of particles having different colors are employed and an electric field is applied in a manner such that one kind of particles of the three kinds of particles is disposed on the observer side. However, this method has a problem in that it is possible to only three kinds of color tones corresponding to colors of the particles.

JP-T-2002-511607 discloses a further method in which two kinds of particles having different colors are dispersed into dispersion media colored in different colors, respectively. This method also has a problem in that it is possible to express only three colors including two colors of the particles and a color of the dispersion medium because only one kind of color tone is expressed when both the two kinds of particles are present on the non-observer side.

According to the above-mentioned known techniques, it is impossible to display (express) more than two kinds of color tones, such as black and white, or more than three kinds of color tones, it is impossible to produce the grayscale with respect to each color, and it is impossible to display good quality black having a sufficiently low reflectivity.

SUMMARY

An advantage of some aspects of the invention is that it provides an electro-optical panel, an electro-optical device, and a driving method of an electro-optical device, in which the electro-optical panel can display (express) four colors, display (express) two-step grayscale with respect to one color, and display good quality black having a sufficiently low reflectivity, thereby having high flexibility of display.

A first aspect of the invention provides an electro-optical panel including a first substrate, a second substrate facing the first substrate, a common electrode disposed on the first substrate, a plurality of pixel electrodes disposed on the second substrate, a liquid dispersion medium which is interposed between a pair of substrate including the first substrate and the second substrate and in which charged particles are dispersed, in which the charged particles include first particles having a first color and second particles having a second color and having been charged to have a polarity different from a polarity of the first particles, the liquid dispersion medium has a third color, each of the plurality of pixel electrodes includes a plurality of sub-electrodes, and a voltage applying unit is provided so as to individually apply voltages to the plurality of sub-electrodes.

With such a structure, in the case in which the first substrate is set to be a displaying side, it is possible to display the first color of the first particles on the first substrate side for every pixel defined by the pixel electrodes by moving the first particles so as to gather on the common electrode side and moving the second particles so as to gather on the pixel electrode side by controlling the voltage applying unit. In a similar manner, it is possible to display the second color of the second particles on the first substrate side with respect to the corresponding pixel by moving the second particles so as to gather on the common electrode side and moving the first particles so as to gather on the pixel electrode side. Accordingly, for example, it is possible to display black having a sufficiently low reflectivity by setting either the first particles or the second particles to have a color of black.

With the structure that both the first particles and the second particles are located close to the pixel electrode but located close to different sub-electrodes, respectively, it is possible to display a mixed color of a third color of the liquid dispersion medium, the first color, and the second color by the corresponding pixel. For this incidence, it is possible to change a color obtained on the basis of the mixed color by varying the distribution state of the first particles and the second particles disposed on the different sub-electrodes, i.e. varying areas occupied by the first particles and the second particles.

For example, when the colors of the first particles and the second particles are set to be colors having different brightnesses, such as white and black, it is possible to impart tones to the third color attributable to the liquid dispersion medium. Accordingly, it is possible to control the mixed color to be brighter by increasing an amount of the white so as to be major and be darker by increasing the black so as to be major by varying the distribution state of the black and the white. Accordingly, it is possible to impart tones to the third color by properly setting the two kinds of particles so as to have different brightnesses and thus it is possible to produce the grayscale of a color.

Alternatively, it is possible to add a different color to the third color of the liquid dispersion medium by setting the two kinds of particles so as to have different colors instead of so as to have different brightnesses, thereby being capable of obtaining a color different from the first color, the second color, and even the third color. For example, in the case in which the first color is cyan, the second color is magenta, and the third color is yellow, it is possible to obtain a color in a wide range, for example, from mixed greenish yellow to orange. That is, it is possible to display greenish yellow by setting the first color (cyan) to be major in the mixed color. On the other hand, it is possible to display orange by setting the second color (magenta) to be major in the mixed color. That is, it is possible to obtain a color different from the third color by setting the two kinds of particles to have proper different colors. By such a method, it is possible to display four kinds of colors including the first color (color phase), the second color (color phase), the third color (color phase), and a fourth color (color phase) which is obtained by adding a mixture of the first color and the second color to the third color.

In the electro-optical panel, it is preferable that each of the plurality pixel electrodes is composed of two sub-electrodes having different areas.

With such a structure, when controlling both the first particles and the second particles to be located close to the pixel electrode but to close to different sub-electrodes, respectively, it is possible to set areas of the first particles and the second particles to be different from each other by a large amount by a simple method of controlling the first particles and the second particles to be disposed at different sub-electrodes.

In the electro-optical panel, it is preferable that a first masking portion is disposed at a position on the displaying side, which corresponds to one sub-electrode having a smaller area of the two sub-electrodes, and the first masking portion hides a display attributable to the sub-electrode having a smaller sub-electrode from view.

With such a structure, since the display attributable to the sub-electrode having a smaller area is hidden by the first masking portion when both the first particles and the second particles are disposed close to the pixel electrode but are arranged close to different sub-electrodes, respectively, only a display attributable to the sub-electrode having a larger area is visible. Accordingly, both the first color and the second color are not mixed with the third color attributable to the liquid dispersion medium, but a color obtained by mixing only either the first color or the second color with the third color can be displayed.

In the electro-optical panel, it is preferable that the two sub-electrodes include a first sub-electrode having a rectangular form and a second sub-electrode having a rectangular and surrounding the first sub-electrode, in which a second masking portion, which hides a display attributable to the second sub-electrode from view, is disposed at a position corresponding to the second sub-electrode and the second masking portion may be formed of a black matrix disposed at a position corresponding to an empty space between the plurality of pixel electrodes.

With such a structure, it is possible to utilize the black matrix, which is generally employed in an electro-optical panel, as the masking portion by forming the black matrix in a manner such that the black matrix has a wider width in comparison with a general black matrix instead of forming an additional masking portion.

In the electro-optical device, it is preferable that the pixel electrode is composed of three or more sub-electrodes.

With such a structure, when the first particles and the second particles are located close to the pixel electrode but are arranged close to different sub-electrodes, respectively, the distribution state of the first particles and the second particles can be diversified into two kinds according to an area ratio of the sub-electrodes.

In the electro-optical panel, it is preferable that the three or more sub-electrodes have the same area.

With such a structure, it is possible to arithmetically change an area ratio of the first particles and the second particles, and thus it is possible to arithmetically produce the grayscale in the case in which the two kinds of the particles are selected so as to have different brightnesses and the first particles and the second particles are used to produce the grayscale.

A section aspect of the invention provides an electro-optical device including the above-mentioned electro-optical panel.

A third aspect of the invention provides a driving method of an electro-optical device including a first substrate, a second substrate facing the first substrate, a common electrode disposed on the first substrate, a plurality of pixel electrodes disposed on the second substrate, and a liquid dispersion medium which is sealed between a pair of substrates including the first substrate and the second substrate and into which charged particles are dispersed, in which the charged particles include first particles having a first color and second particles having a second color and having been charged to have a polarity different from a polarity of the first particles, the liquid dispersion medium has a third color, each of the plurality of pixel electrodes includes a plurality of sub-electrodes, and a voltage applying unit is provided in order to individually apply a voltage to the plurality of sub-electrodes, in which the voltage applying unit is controlled so as for both the first particles and second particles to be located close to either the common electrode or the plurality of sub-electrodes, or to be located close to different sides, respectively.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the present invention will be described in greater detail.

First Embodiment

Figure 1:
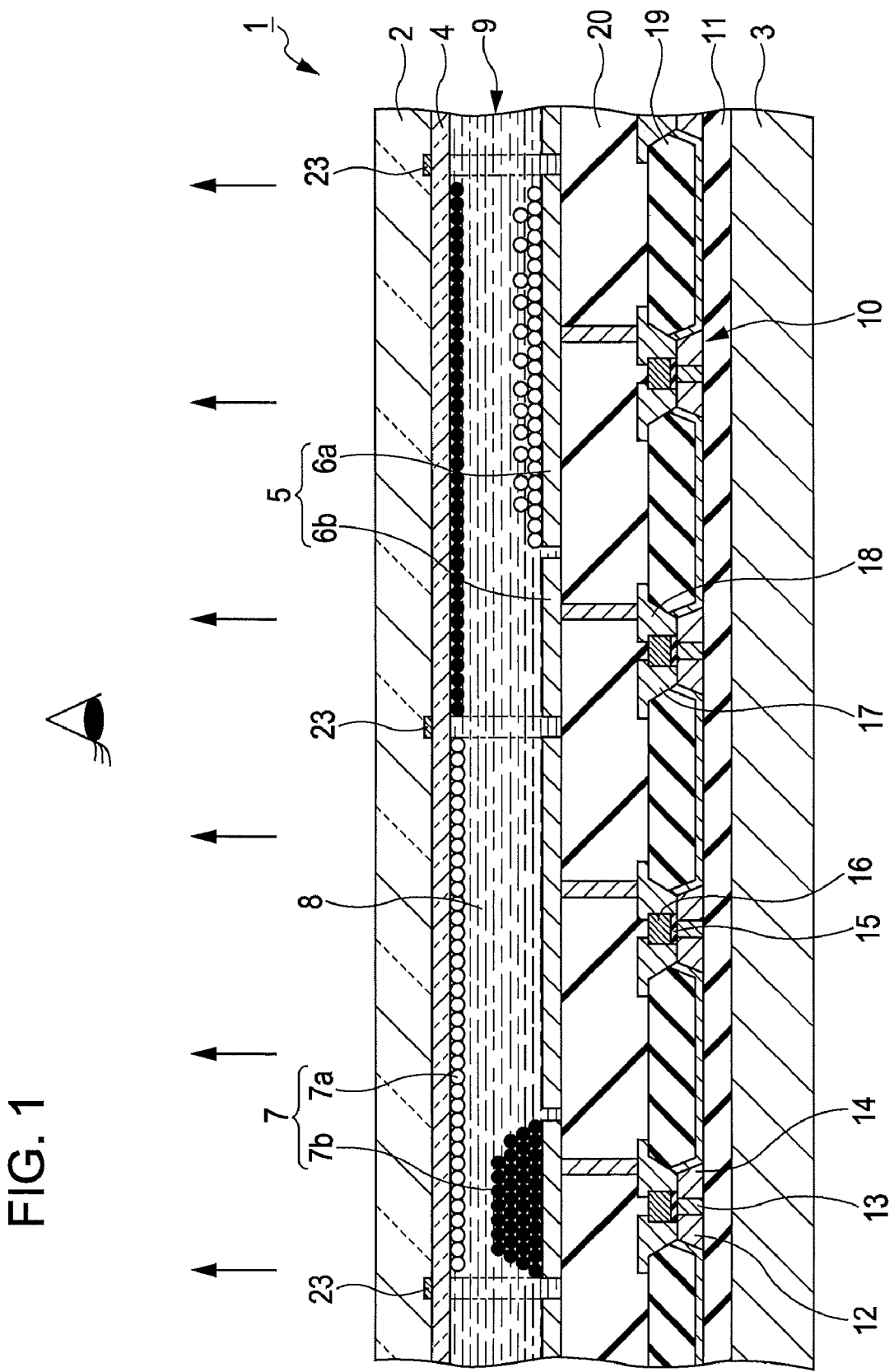
FIG. 1 is a side sectional view illustrating the overall structure of main part of an electro-optical panel according to a first embodiment.

FIG. 1 shows an electro-optical panel according to a first embodiment. Reference 1 in FIG. 1 denotes an electro-optical panel according to the first embodiment. This electro-optical panel 1 is generally called an electrophoretic panel and includes a first substrate 2 and a second substrate 3 which are attached to each other and faces each other. The first substrate 2 is a displaying side substrate in this embodiment. That is, the first substrate 2 is structured in a manner such that the outer surface of the first substrate 2 serves as an observing surface and the inner surface of the first substrate 2 is provided with a common electrode 4.

Figure 2A:
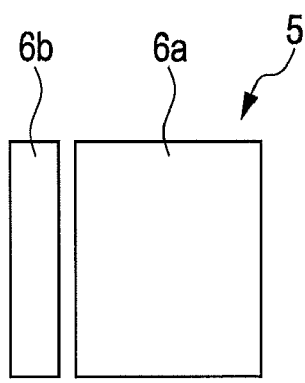
FIGS. 2A to 2C are plan views illustrating the structure of a pixel electrode.
Figure 2B:
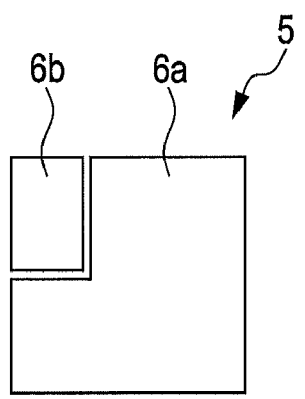
Figure 2C:
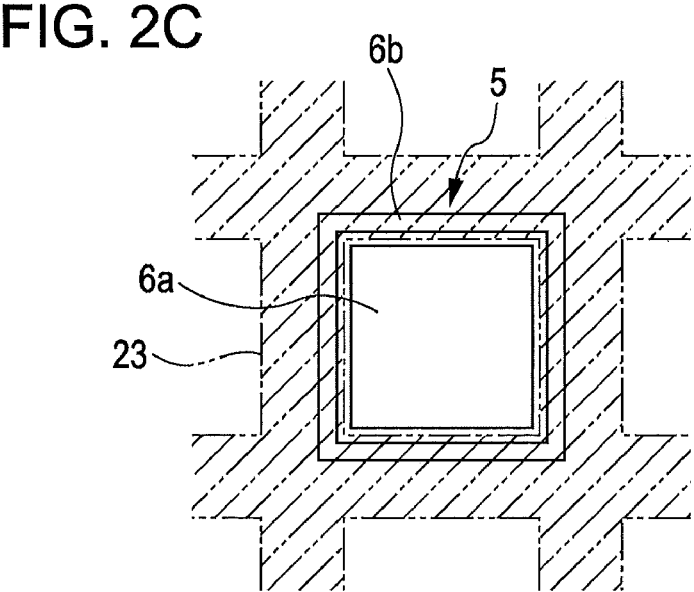

The second substrate 3 is provided with driving elements as described below. On the inner surface of the second substrate 2 is provided a plurality of pixel electrodes 5 arranged in a matrix form. Each of the pixel electrodes 5 has a rectangular shape. Pixels of the electro-optical panel 1 are formed so as to correspond to the pixel electrodes 5, respectively. According to the invention, the pixel electrode 5 is composed of a plurality of sub-electrodes 6 (6a and 6b). In this embodiment, as shown in FIG. 1 and FIG. 2A, each of the pixel electrodes 5 is composed of the sub-electrodes 6a and 6b having different widths and different areas. However, it also may be satisfactory that each of the pixel electrodes 5 is composed of two sub-electrodes 6a and 6b having different areas. Accordingly, as shown in FIG. 2B and FIG. 2C, each of the pixel electrodes 5 is composed of the sub-electrodes 6a and 6b having a rectangular shape.

A liquid-phase dispersion medium 8 into which charged particles 7 are dispersed is sealed between the first substrate 2 and the second substrate 3. Accordingly, a liquid member 9 is formed between the first substrate 2 and the second substrate 3. According to this embodiment, the liquid members 9 in every pixel are discontinuous, so that every pixel defined by the pixel electrodes 5 can be independently well controlled by the charged particles. In more detail, each cell structure includes a microcapsule (not shown in figures) having the same size as a single pixel, charged particles 7, and a liquid dispersion medium, in which the charged particles and the liquid dispersion medium are sealed in the microcapsule 7. Alternatively, as disclosed in JP-A-49-32038, a single cell may employ porous spacers. In further alternative manner, adequate partitioning members are disposed between the pixels in order to define cell structures. However, this invention can construct the electro-optical panel by using the liquid member which continuously extends as well as by using the above-mentioned cell structure.

The charged particles 7 are organic or inorganic particles (molecules having a high molecular weight or colloid) having a characteristic of electrophoretic motion caused by a potential difference in the liquid dispersion medium 8. The charged particles 7 are composed of first particles 7a and second particles 7b. The first and second particles 7a and 7b are charged reverse to each other in their polarities and have different colors, i.e. a first color and a second color, respectively. In this embodiment, the first particles 7a are charged positive and have a first color white. The second particles 7b are charged negative and have a second color black. The colors of the charged particles 7 may be other than black and white.

As for the charged particles 7, black pigments, such as aniline black, carbon black, titan black and white pigments, such as titanium dioxides, zinc oxides, and antimony trioxides can be used. For another colors other than black and white, azo-based pigments, such as mono-azo, bis-azo, and poly-azo; yellow pigments, such as isoindolinone, chrome yellow, yellow color iron oxide, cadmium yellow, titan yellow, anthimon; red pigments, such as quinacridone red and chrome vermilion; blue pigments such as phthalocyanine blue, indanthrene blue, anthraquinone-based dye, iron blue pigment, ultramarine blue pigment, and cobalt blue pigment; and green pigments, such as phthalocyanine green pigment are used.

Under circumstances, a charge control agent made of particles of electrolyte, surfactant, metal soap, resin, rubber, oil, varnish, or powder; a dispersing agent such as titanium-based coupling agent, aluminum-based coupling agent, and silane-based coupling agent; a lubricant; and a stabilizer can be added to the pigment.

A specific gravity of each of the charged particles 7 is set to be almost the same as a specific gravity of the liquid dispersion medium 8 which diffuses the charged particles 7.

Since the liquid dispersion medium 8 has a third color different from the first color (white) and the second color (black), the liquid dispersion medium 8 is prepared so as to have a relatively high transparency. When the liquid member 9 is formed between the first substrate 2 and the third substrate 3, in the liquid dispersion medium 8, the transparency of the liquid 9 member is adjusted so as for a color on the pixel electrode side to be reflected on the displaying side opposite the pixel electrode side. That is, when both the first particles 7a and the second particles 7b move toward the pixel electrode, a color (mixed color), on which colors of the first particles 7a and the second colors 7b disposed close to the pixel electrode are reflected, as well as a color of the liquid dispersion medium 8 are displayed on the common electrode side serving as the displaying side.

As the liquid dispersion medium 8, water; an alcohol-based solvent, such as methanol, ethanol, isopropanol, butyl alcohol, octyl alcohol, ethyleneglycol monomethyl ether; a variety of esters, such as ethyl acetate and n-butyl acetate; ketones, such as acetone, methyl ethyl ketone, and methyl isobutyl ketone; aliphatic hydrocarbon, such as pentane, hexane, and octane; cycloaliphatic hydrocarbon, such as cyclohexane and methylcyclohexane; aromatic hydrocarbon, such as benzenes having a long-chain alkyl group, such as benzene, toluene, xylene, hexylbenzene, heptylbenzene, octylbenzene, nonylbenzene, decylbenzene, dodecylbenzene, and tetradecylbenzene; halogenated hydrocarbon, such as methylene chloride, chloroform, carbon tetrachloride, and 1,2-dichloroethane; alkanoic salt; and other kinds of oils can be used in the form of a single material or a mixture. Further, surfactant may be added to the above-mentioned solvent. Under circumstances, a coloring agent can be also further added to the mixture of the solvent and the surfactant.

As the colorant, a variety of dye can be used. Alternatively, some pigments can be used as the colorant. However, only some of pigments, which disperse uniformly into the liquid dispersion medium 8 but which do not move toward electrodes by an electrical potential difference, can be used unlike the charged particles 7. The transparency of the colorant is determined in a manner such that the liquid member 9 maintains the above-mentioned degree of transparency, and the concentration of the colorant is also determined on the basis of the determined transparency. Further, the transparency of the liquid member 9 is determined depending on the kinds of the liquid dispersion medium 8, the kinds of the colorant, and the concentration of the colorant, and also varies according to the depth of the liquid member (distance between the first substrate 2 and the second substrate 3). Accordingly, the transparency of the liquid dispersion medium 8, which is needed, is preliminarily measured by an experiment and the concentration of the colorant is adjusted so as to achieve the measured transparency.

In this embodiment, a third color of the liquid dispersion medium 8 is set to be transparency red. However, the color of the liquid dispersion medium 8 may be any color of a variety of colors described below like the charged particles 7.

Both the first substrate 2 and the second substrate 3 may be formed of a resin substrate in a rectangular film form or in a rectangular sheet form in the case in which it is required that the first substrate 2 and the second substrate 3 be flexible, that is, in the case in which the electro-optical panel 1 is used as an IC card or an electronic paper.

The first substrate 2 serving as a displaying surface (observing surface) is made of a transparent material (having a high optical transparency). In greater detail, it is most desirable that the first substrate 2 is made of polyethylene terephthalate (PET), polyether sulfone (PES), or poly carbonate (PC). On the other hand, it is not needed that the second substrate 3 is transparent or has a high optical transparency. Accordingly, the second substrate 3 can be formed of any material selected from the group consisting of polyethylene naphthalate (PEN), polyethylene (PE), polystyrene (PS), polypropylene (PP), polyetheretherketone (PEEK), poly acrylic acid and polyacrylate in addition to the above-mentioned materials.

In the case in which it is not needed that the electro-optical panel 1 is flexible like general panels, the substrates 2 and 3 may be made of glass, hard resin, or semiconductor such as silicon.

Since the first substrate 2 provides the displaying surface, the common electrode 4 is made of a transparent material (a material having a high optical transparency). In greater detail, examples of the material for the common electrode 4 include conductive oxides such as indium tin oxide (ITO), conductive polymers such as polyaniline, and ion conductive polymers prepared by dispersing ionic substance such as NaCl, $LiClO_4$, and KCl into a polymer matrix such as polyvinyl alcohol resin and polycarbonate resin. Only one material of the above-mentioned materials can be used and two or more materials of the above-mentioned materials can be used in a mixture form.

On the other hand, since the second substrate 3 does not provide the displaying side, it is not needed that the pixel electrodes 5 are transparent or are made of a material having a high optical transparency. Accordingly, in addition to the transparent materials, general conductive materials such as metals and metal alloys can be used to form the pixel electrodes 5.

On the second substrate 3 is provided thin film transistors (TFTs) 10 connected to sub-electrodes 6a and 6b constituting the pixel electrode 5.

Each of the TFTs 10 is composed of a source region 12, a channel 13, and a drain region 14 which are formed on a base insulation layer 11 on the second substrate 3, a gate insulation film 15 formed over the source region 12, the channel 13, and the drain region 14, a gate electrode 16 formed on the gate insulation film 15, a source electrode 17 formed over the source region 12, and a drain electrode 18 formed over the drain region 14. The TFTs 10 are sequentially covered by an inter-layer insulation layer 19 and an inter-layer insulation layer 20. In each of the TFTs 10, the drain electrode 18 is connected to the sub-electrodes 6a and 6b via contact holes (not shown). The TFTs 10 function as switching elements and are configured so as to individually apply electric potentials to the sub-electrodes 6a and 6b.

Figure 3:
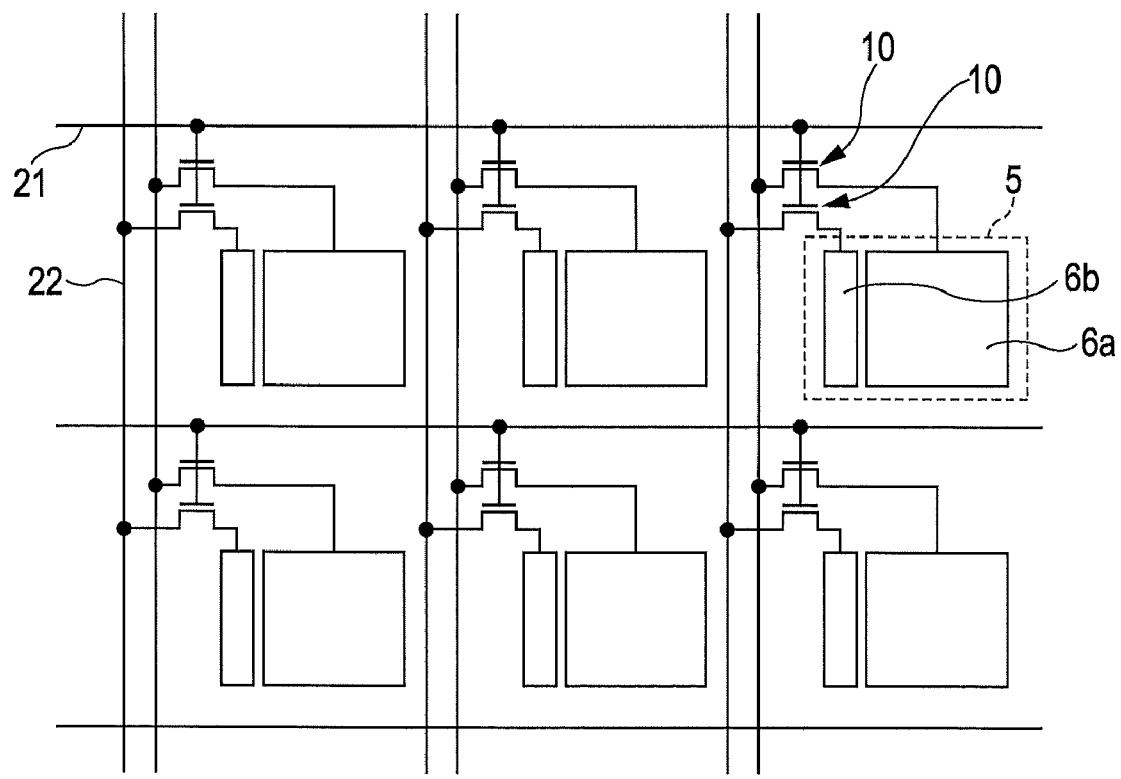
FIG. 3 is an equivalent circuit diagram of an electro-optical device.

FIG. 3 shows an equivalent circuit of the electro-optical panel 1. As shown in FIG. 3, each of the sub-electrodes 6a and 6b constituting the pixel electrode 5 is connected to the drain electrode 18 of each of the TFTs 10. Each of the TFTs 10 is connected to a scan line 21 at the gate 16 thereof and to s signal line 22 at the source electrode 17 thereof.

As described above, since each of the sub-electrodes 6a and 6b is connected to the TFT 10 serving as a switching element, voltages can be individually applied across the common electrode 4 and the sub-electrodes 6a and 6b. That is, the voltage applying unit in the invention is structured by employing the TFT 10 as the switching element.

A known black matrix 23 is formed on the first substrate 2 so as to correspond to positions surrounding pixels defined by the pixel electrodes 5 as shown in FIG. 1.

An electro-optical device according to the invention employs the electro-optical panel 1 having the above-mentioned structure.

Next, the operation of the electro-optical panel 1 having the above-mentioned structure will be described. Further, in order to simplify the description, the operation of the electro-optical panel is explained with respect to one pixel.

Figure 4A:
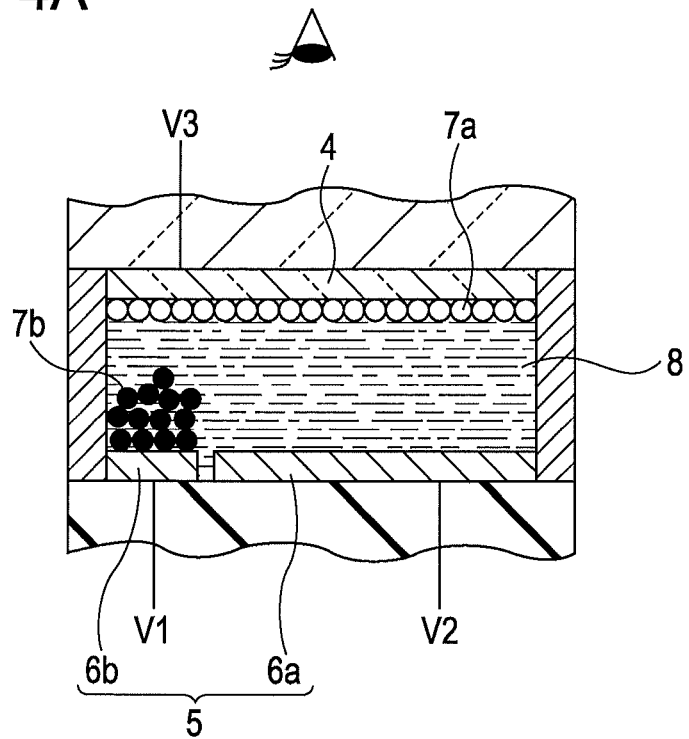
FIGS. 4A and 4B are schematic views for explaining the operation of one pixel.
Figure 4B:
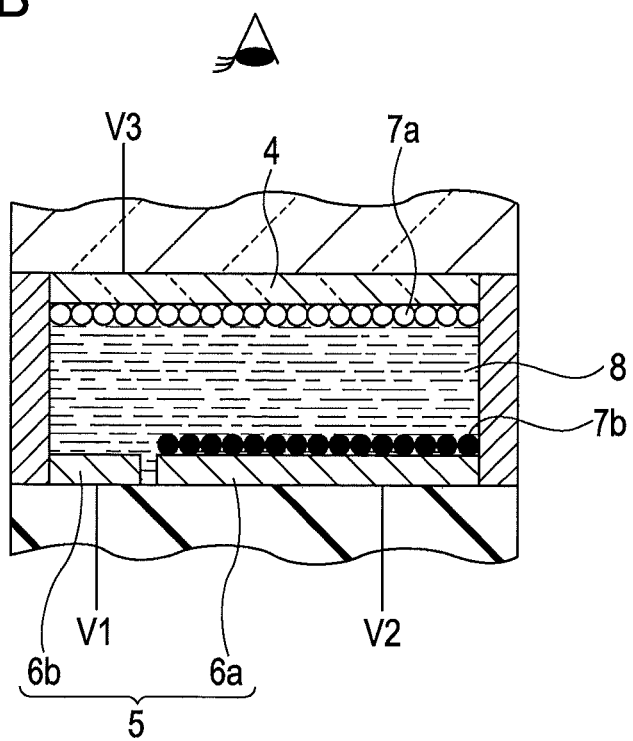

With respect to one pixel which is an object pixel to be driven, in the case of intending to display (express) a color (white) of the first particles, as shown in schematic views of FIGS. 4A and 4B, the first particles 7a move toward the common electrode 4 by the control of the voltage applying unit employing the TFT 10. For this instance, when a potential applied to the sub-electrode 6b having a smaller area is defined V1, a potential applied to the sub-electrode 6a having a larger area is defined as V2, and a potential applied to the common electrode 4 is defined as V3, it is possible to display the first color (white) by controlling application voltages so as to satisfy the following expressions:

$$V1 \geq V2 > V3 \quad \text{(Expression 1)}$$

$$V2 \geq V1 > V3 \quad \text{(Expression 2)}$$

That is, since the potential V3 applied to the common electrode 4 is set to be lower than the potentials V2 and V3 applied to the sub-electrodes 6b and 6a, white particles (the first particles 7a) charged positive move toward the common electrode 4 which is at the lowest potential as shown in FIGS. 4A and 4B. On the other hand, black particles (the second particles 7b) charged negative move toward the sub-electrode 6b which is at the highest potential as shown in FIG. 4A when the potentials V1, V2, and V3 are in the relationship of Expression 1, but move to the sub-electrode 6a which is at the highest potential as shown in FIG. 4B when the potentials V1, V2, and V3 are in the relationship of Expression 2.

That is, when V1=V2>V3, the black particles (the second particles 7b) move toward either the sub-electrode 6b or the sub-electrode 6a but the white particles (the first particles 7a) move toward the common electrode 4.

Accordingly, it is possible to display the color (white) of the first particles 7a by a pixel by controlling the potentials V1, V2, and V3 so as to satisfy Expression 1 or Expression 2 in the corresponding pixel.

Figure 5A:
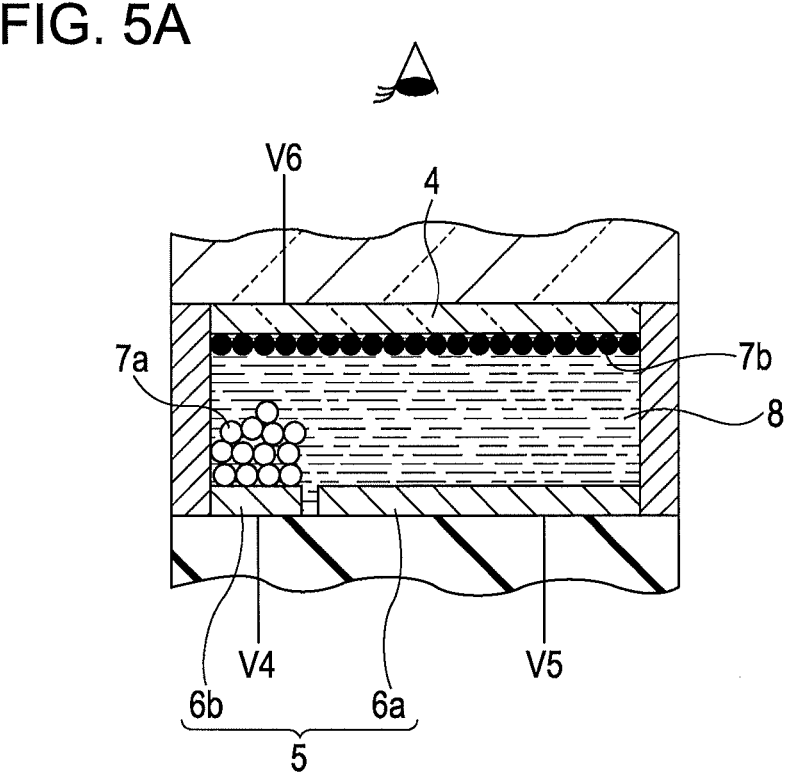
FIGS. 5A and 5B are schematic views for explaining the operation of one pixel.
Figure 5B:
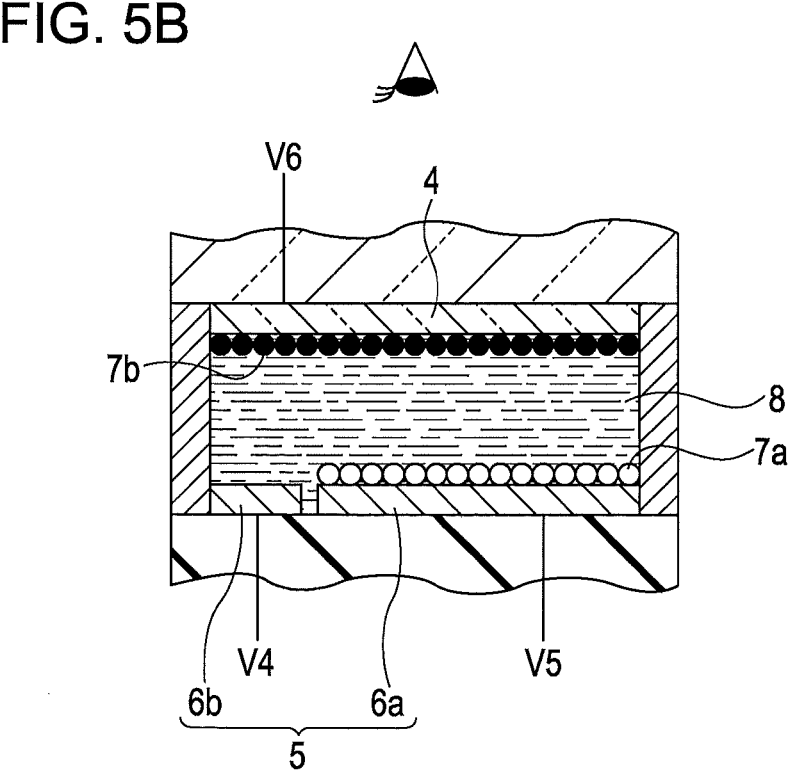

When intending to display the color (black) of the second particles by one pixel which is an object pixel to be driven, as shown in schematic views of FIGS. 5A and 5B, the voltage applying unit is controlled so as to make the second particles 7b move toward the common electrode 4. For this instance, when a potential applied to the sub-electrode 6b is defined as V4, a potential applied to the sub-electrode 6a is defined as V5, and a potential applied to the common electrode 4 is defined as V6, it is possible to display the color (black) of the second particles by controlling the application voltages so as to satisfy the following expressions:

$$V4 \leq V5 < V6 \quad \text{(Expression 3)}$$

$$V5 \leq V4 < V6 \quad \text{(Expression 4)}$$

That is, since the potential V6 applied to the common electrode 4 is set to be higher than the potentials V5 and V4 applied to the sub-electrodes 6a and 6b, the black particles (the second particles 7b) charged negative move toward the common electrode 4 which is at the highest potential as shown in FIGS. 5A and 5B. On the other hand, the white particles (the first particles) charged positive move toward the sub-electrode 6b which is at the lowest potential as shown in FIG. 5A when the potentials V4, V5, and V6 are in the relationship of Expression 3, but move toward the sub-electrode 6a which is at the lowest potential as shown in FIG. 5B when the potentials V4, V5, and V6 are in the relationship of Expression 4.

That is, when V4=V5<V6, the white particles (the first particles 7a) move toward either the sub-electrode 6b or the sub-electrode 6a but the black particles (the second particles 7b) move toward the common electrode 4.

Accordingly, it is possible to display the color (black) of the second particles 7b by the object pixel by controlling the potentials V4, V5, and V6 so as to satisfy Expression 3 or Expression 4 in the corresponding pixel.

Figure 6A:
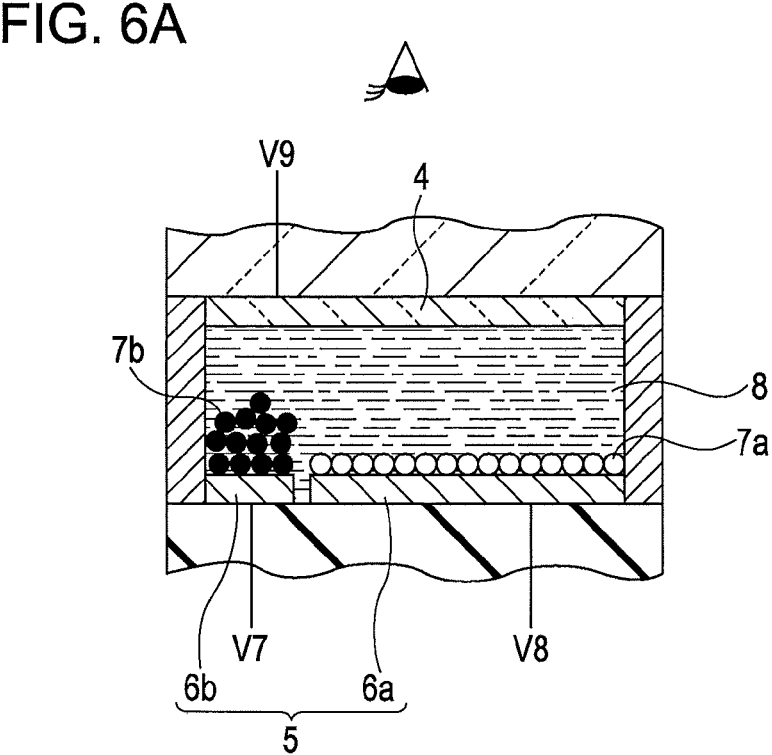
FIGS. 6A and 6B are schematic views for explaining the operation of one pixel.
Figure 6B:
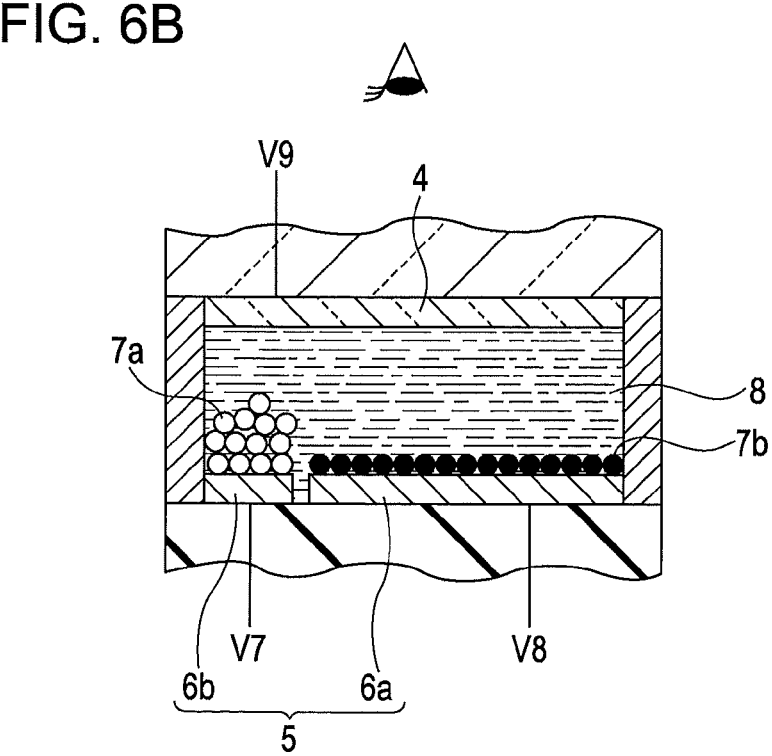

When intending to display (express) a third color (red) of the liquid dispersion medium 8 by the object pixel to be driven, as shown in schematic views of FIGS. 6A and 6B, the voltage applying unit is controlled so as to make both the first particles 7a and the second particles 7b move toward the pixel electrode 5 (the sub-electrodes 6b and 6a). By this driving method, it is possible to directly display the third color (red) of the liquid dispersion medium 8 and also to display another color which is different from the third color and is produced by reflecting a color on the pixel electrode side onto the third color.

In order to make both the first particles 7a and the second particles 7b move toward the pixel electrode 5 (the sub-electrodes 6b and 6a), when a potential applied to the sub-electrode 6b is defined as V7, a potential applied to the sub-electrode 6a is defined as V8, and a potential applied to the common electrode 4 is defined as V9, the voltage applying unit is controlled so as to satisfy the following expressions:

$$V7 > V9 > V8 \quad \text{(Expression 5)}$$

$$V7 < V9 < V8 \quad \text{(Expression 6)}$$

If the voltage applying unit is controlled so as to satisfy Expression 5, the black particles (the second particles 7b) charged negative move toward the sub-electrode 6b which is at the highest potential as shown in FIG. 6A. On the other hand, the white particles (the first particles 7a) charged positive move toward the sub-electrode 6a which is at the lowest potential. Accordingly, since neither the black particles (the second particles 7b) and the white particles (the first particles 7a) do not move toward the common electrode 4 which is the displaying side, the color (red) of the liquid dispersion medium 8 is displayed from the displaying side. However, the transparency of the liquid dispersion medium 8 must be adjusted to a degree by which the color on the pixel electrode 5 side opposite the displaying side can be reflected on the displaying side. Accordingly, a color produced by making the color of the first particles 7a and the color of the second particles 7b influence on the mixed color can be displayed on the common electrode 4 side which is the displaying side.

Here, the reason that the mixed color is displayed will be described.

The color on the displaying side, i.e. the color viewed by an observer on the displaying side is a color component, which is not absorbed by the displaying surface and turns back to a light source, of color components of light impinging on the displaying surface. Accordingly, in the case in which the first particles 7a and the second particles 7b are present near the common electrode 4 which is an observing side (displaying side), since light components are absorbed by or reflected from the surfaces of the particles 7a and/or 7b, the color of the particles, i.e. white or black, is displayed on the observing side (displaying side).

Conversely, in the case in which the liquid dispersion medium 8 having the third color (red) is present on the observing side (near the common electrode), some portion of light is absorbed while the light penetrates through the liquid dispersion medium 8, absorbed again when the light is reflected from the pixel electrode 5 (the sub-electrodes 6a and 6b), and absorbed further again when the light turns back passing through the liquid dispersion medium 8. Accordingly, the observed color (displayed color) is influenced by the light reflection and absorption characteristics of the pixel electrode 5 (the sub-electrodes 6a and 6b) as well as the light absorption characteristic of the liquid dispersion medium 8.

Accordingly, if the voltage applying unit is controlled so as to satisfy Expression 5, the black particles (the second particles 7b) move toward the sub-electrode 6b having a smaller area, and the white particles (the first particles 7a) move to the sub-electrode 6a having a larger area as shown in FIG. 6A, the observed color (displayed color) is more strongly influenced by the white particles (the first particles 7a) distributed in a larger area than the black particles distributed in a smaller area. Accordingly, relatively bright (white-tinged) red (fourth color) comes to be displayed (expressed). That is, since the area of a single pixel is very small and thus regions corresponding to the sub-pixels 6a and 6b cannot be discriminated by the human eyes, only a mixed color is visible as a dot.

If the voltage applying unit is controlled so as to satisfy Expression 6, the black particles (the second particles 7b) charged negative move toward the sub-pixel 6a having a larger area and having the highest potential and the white particles (the first particles 7a) charged positive move to the sub-electrode 6b having a smaller area and having the lowest potential. Accordingly, the observed color (displayed color) is more strongly influenced by the black particles (the second particles 7b) distributed in a larger area and thus relatively dark (black-tinged) red (fifth color) can be displayed (expressed).

In this embodiment, particles having a pair of colors (black and white) having different brightnesses are used as the first particles 7a and the second particles. Accordingly, it is possible to impart the tones to the third color of the liquid dispersion medium 8, and thus it is possible to display the third color with two tones.

The above description is made with respect to one pixel. However, in the case in which cells are structured in a manner such that the liquid members 9 are discontinuous for every pixel, it is possible to set a color of the particles and a color of the liquid dispersion mediums 8 in each pixel to be different from a color of the particles and a color of the liquid dispersion mediums 8 in different pixels. Accordingly, in the case in which three primary colors of red, blue, and green are used as the colors (third colors) of the liquid dispersion mediums 8, if R pixels having the liquid dispersion mediums 8 having red color, B pixels having the liquid dispersion mediums 8 having blue color, and G pixels having the liquid dispersion mediums 8 having green color are constructed, and the R pixels, the B pixels, and the G pixels are properly arranged in a predetermined manner. Accordingly, it is possible to realize a full color display. In such a case, since a black display can be realized by the black particles, it is possible to display good black having a sufficiently low reflectivity without using the known subtractive color mixing process. Further, it is possible to realize the full color display on the basis of R, G, and B by the pixels as a whole and every pixel can express the above-described tones. Accordingly, the electro-optical panel having the above-mentioned structure has remarkably good display characteristic.

Returning to the description with respect to a single pixel, colors of two kinds of particles (the first particles 7a and the second particles 7b) can be a combination of colors having different brightnesses, such as black and white and also may be a combination of colors having different color phases. In the latter case, by imparting a different color phase to the third color of the liquid dispersion medium 8, it is possible to obtain color phases of a mixed color, for example the fourth color and the fifth color, which are different from original colors including the first color, the second color, and the third color.

In Table 1, the detailed relationship between the first color of the first particles 7a, the second color of the second particles 7b, and the third color of the liquid dispersion medium 8 is shown. Further, in Table 1, the fourth color and the fifth color which can be obtained on the basis of the first color, the second color, and the third color are also shown. As shown in Table 1, by selecting the first color, the second color, and third color as colors of the first particles, the second particles, and the liquid dispersion medium, the first color, the second color, the fourth color, and the fifth color can be practically displayed. The fourth color is a color obtained when the pixel is controlled (driven) under the condition satisfying Expression 5 and the fifth color is a color obtained when the pixel is controlled (driven) under the condition satisfying Expression 6.

TABLE 1

| | First color | Second color | Third color | Fourth color | Fifth color |
| --- | --- | --- | --- | --- | --- |
| Example 1 | White | Black | Red | Bright red | Dark red |
| Example 2 | White | Black | Blue | Bright blue | Dark blue |
| Example 3 | White | Black | Green | Bright green | Dark green |

TABLE 1-continued

| | First color | Second color | Third color | Fourth color | Fifth color |
| --- | --- | --- | --- | --- | --- |
| Example 4 | White | Magenta | Cyan | Bright cyan | Bright blue |
| Example 5 | Cyan | Magenta | Yellow | Yellowish green | Orange |
| Example 6 | Magenta | Yellow | Cyan | Greenish blue | Bluish green |
| Example 7 | White | Cyan | Red | Bright red | Dark red |

For example, Example 1 in Table 1 is described above. That is, it is possible to display (express) four kinds of colors including bright red and dark red in addition to white and black (three kinds of color phases and two tones of one color phase of the three kinds of color phases).

As in Example 5, when cyan is selected as the first color, magenta is selected as the second color, and yellow is selected as the third color, it is possible to display greenish yellow and orange as the fourth color and the fifth color. That is, it is possible to display greenish yellow by strongly reflecting the first color (cyan) on the color (yellow) of the liquid dispersion medium 8 and it is possible to display orange by strongly reflecting the second color (magenta) on the color (yellow) of the liquid dispersion medium 8.

That is, by properly setting colors of the two kinds of particles so as for color phases of the two kinds of particles to be different from each other, it is possible to impart different color phases to the third color and thus it is possible to display (express) four kinds of colors (color phases) including the fourth color (color phase) and the fifth color (color phase) in addition to the first color (color phase) and the second color (color phase). Accordingly, the electro-optical panel 1 has high display flexibility and good display characteristic.

The shapes of the sub-electrodes 6a and 6b are not limited to the shapes shown in FIGS. 2A to 2C but may be arbitrary. Further, the area ratio can be arbitrarily set. In the case particularly in which the two kinds of particles are a combination of different brightnesses, if the area ratio is set to be high, it is possible to produce the fourth color and the fifth color which are highly different in brightness (grayscale). Conversely, if the area ratio is set to be low, it is possible to produce the fourth color and the fifth color which are slightly different in brightness (grayscale). In the case in which the two kinds of particles are a combination of different colors, if the area ratio is set to be high, it is possible to produce the fourth color and the fifth color which are highly different in color phases. Conversely, if the area ratio is set to be low, it is possible to produce the fourth color and the fifth color which are slightly different in color phases.

In order to make the fourth color and the fifth color have highly different color phases, it is desirable that a masking portion (a first masking portion, a second masking portion), which hides a display attributable to the sub-electrode 6b from view, is disposed in a position on the displaying side, the portion corresponding to the sub-electrode 6b having a smaller area of the two sub-electrodes 6a and 6b. In greater detail, as shown in FIG. 2C, the sub-electrode 6a having a larger area of the two sub-electrodes 6a and 6b is set to be a first sub-electrode 6a having a rectangular shape and the sub-electrode 6b having a smaller area is set to be a second sub-electrode 6b having a rectangular shape and surrounding the first sub-electrode 6a. Further, a black matrix 23 (shown in FIG. 1) disposed so as to correspond to empty spaces between the pixel electrodes 5 adjacent to each other is arranged so as to cover the second sub-electrodes 6b as indicated by dashed-two dotted line as shown in FIG. 2C. Accordingly, it is possible to set the position corresponding to the second sub-electrode 6b to be non-display region.

For example, in the state shown in FIG. 6A, the displayed color (the observed color) is highly influenced by the white particles (the first particles 7a) disposed on the sub-electrode 6a having a larger area and thus the displayed color becomes bright red. However, in practical, since the displayed color is also influenced by the black particles (the second particles 7b) on the sub-electrode 6b having a smaller area, black is imparted to the displayed color and thus bright red may not be displayed.

However, if the sub-electrode 6b is covered by the black matrix 23, the display region is restricted to a region in the sub-electrode 6a. Accordingly, the displayed color is not influenced by the black particles located on the sub-electrode 6b and thus brighter red (white-tinged red) comes to be displayed (observed).

Considering the shapes of the sub-electrodes 6a and 6b shown in FIGS. 2A and 2B, it is possible to more clearly display the fourth color and the fifth color by modifying the black matrix 23 or by covering the sub-electrode 6b with a masking portion other than the black matrix 23. However, with such a structure, an aperture ratio of the pixel is decreased. Accordingly, it is not preferable that the sub-electrode 6a having a larger area is masked.

Second Embodiment

Next, an electro-optical panel according to a second embodiment will be described.

Figure 7A:
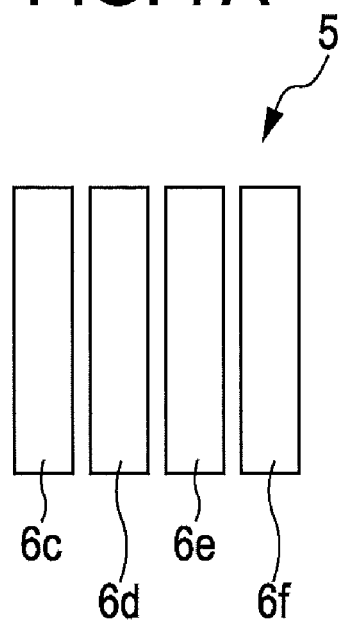
FIGS. 7A and 7B are plan views illustrating the structure of a pixel electrode.
Figure 7B:
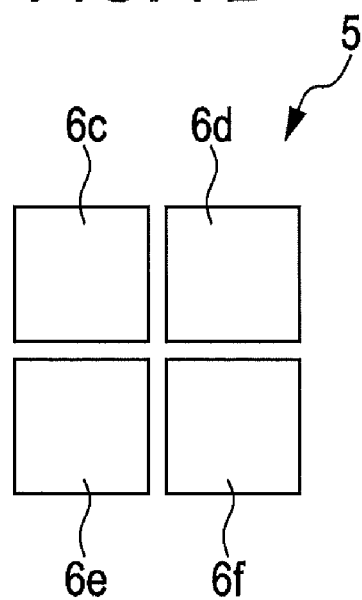

The difference between the second embodiment and the first embodiment is that each pixel electrode 5 is composed of four sub-electrodes 6c, 6d, 6e, and 6f having the same area. That is, as shown in FIG. 7A, the rectangular-shaped sub-electrodes 6c, 6d, 6e, and 6f are arranged in parallel with each other. Alternatively, as shown in FIG. 7B, square-shaped sub-electrodes 6c, 6d, 6e, and 6f are arranged in a longitudinal direction and a lateral direction of the electro-optical panel, thereby forming a rectangular-shaped (square-shaped) pixel as a whole.

FIGS. 8A, 8B, 9A, 9S, and 9C show the state in which the sub-pixels 6c, 6d, 6e, and 6f are arranged in a manner shown in FIG. 7A. The following description is made with reference to these figures.

In the similar manner with the above-mentioned embodiment, the sub-electrodes are connected to the voltage applying units employing the TFTs 10 serving as switching elements. With such a structure, potentials are individually applied to the sub-electrodes 6c, 6d, 6e, and 6f.

Figure 8A:
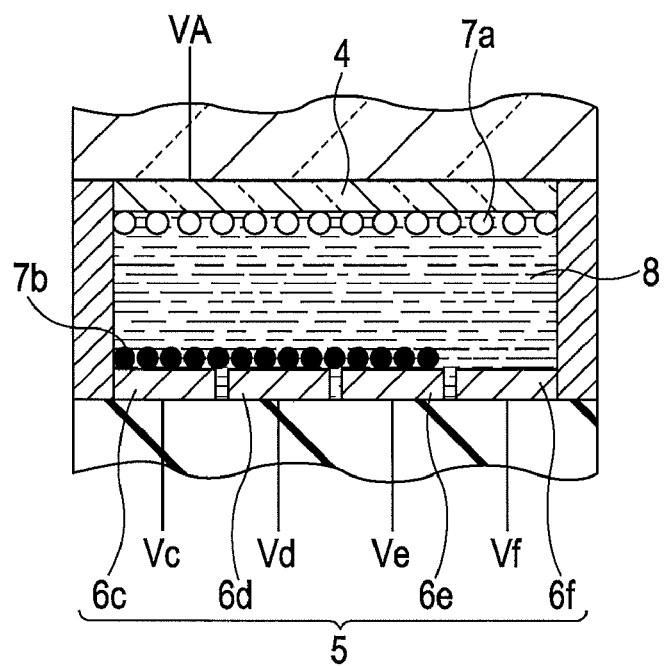
FIGS. 8A and 8B are schematic views for explaining the operation of one pixel.

In such an electro-optical panel, when intending to display the color (white) of the first particles 7a, as shown in FIG. 8A, the voltage applying unit is controlled so as for the first particles 7a to move to the common electrode 4 side. For this instance, when a potential applied to the sub-electrode 6c is defined as Vc, a potential applied to the sub-electrode 6d is defined as Vd, a potential applied to the sub-electrode 6e is defined as Ve, a potential applied to the sub-electrode 6f is defined as Vf, and a potential applied to the common electrode 4 is defined as VA, it is possible to display the first color (white) by controlling application voltages to satisfy the following expression by the voltage applying unit:

$$Vc=Vd=Ve>Vf>VA \qquad \text{(Expression 7)}$$

In an example shown in FIG. 8A, the second particles 7b move so as to be disposed on the sub-electrodes 6c, 6d, and 6e. However, in the case of displaying the color (white) of the first particles 7a by moving the first particles 7a to the displaying side (the common electrode 4 side), any distribution state of the second particles 7b on the pixel electrode 5 side never influences on the displayed color. Accordingly, the second particles 7b are moved to be disposed on arbitrary sub-electrodes on the pixel electrode 5 side.

Figure 8B:
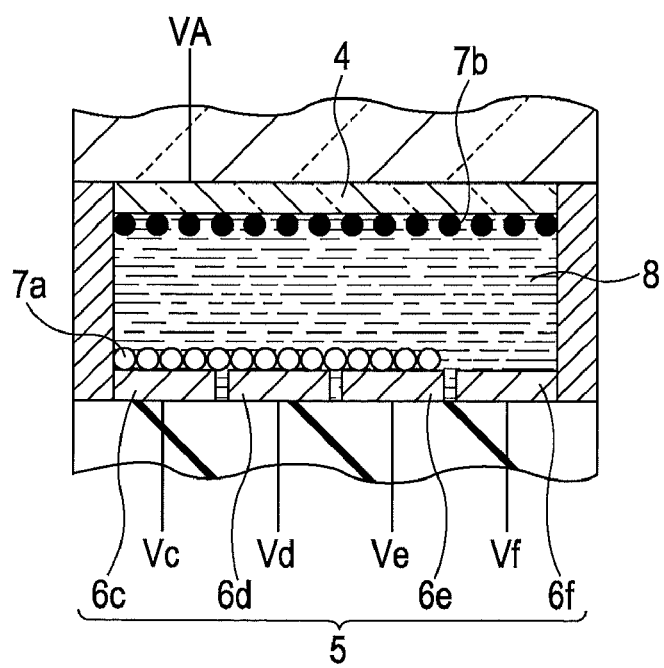

When intending to display (express) the color (black) of the second particles 7a, as shown in FIG. 8B, the voltage applying unit is controlled so as for the second particles 7b to move to the common electrode 4. For this instance, it is possible to display the second color (black) by controlling the application voltage so as to satisfy the following expression:

$$Vc=Vd=Ve<Vf<VA \qquad \text{(Expression 8)}$$

In even this case, the first particles 7a are moved so as to be disposed on arbitrary sub-electrodes on the pixel electrode 5 side.

Figure 9A:
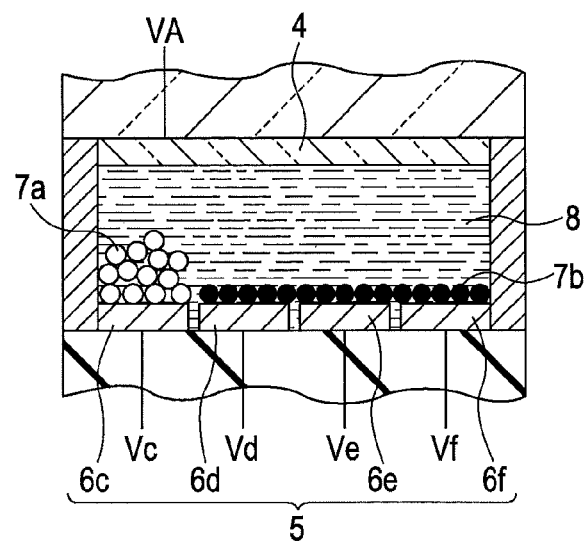
FIGS. 9A to 9C are schematic views for explaining the operation of one pixel.
Figure 9B:
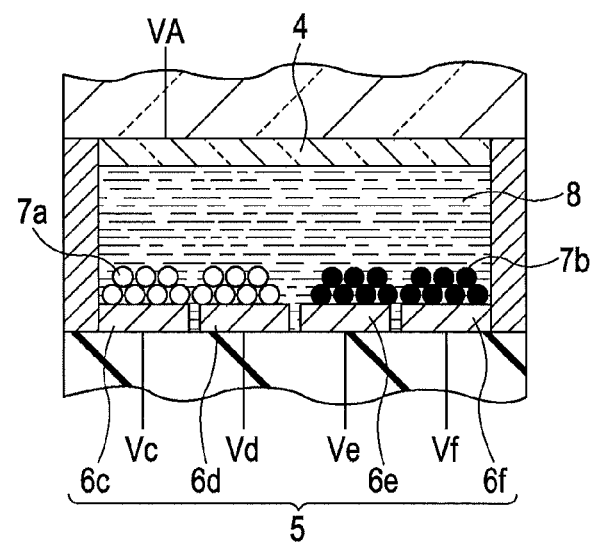
Figure 9C:
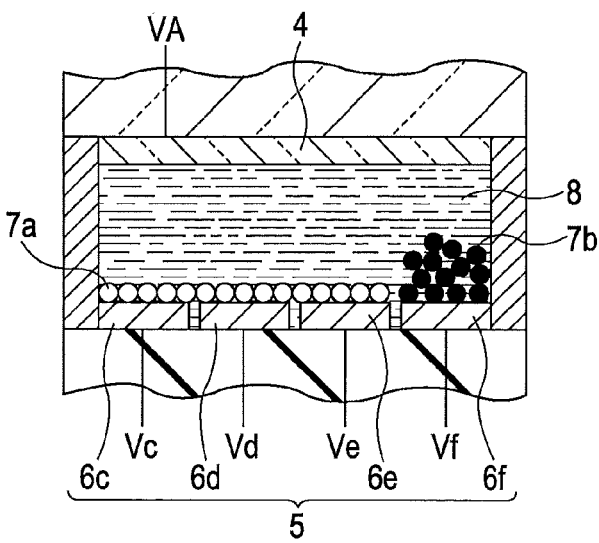

When intending to display (express) the color (red, the third color) of the liquid dispersion medium 8, as shown in FIGS. 9A, 9B, and 9C, the voltage applying unit is controlled so as for the first particles 7a and the second particles 7b to move to the pixel electrode 5 (the sub-electrodes 6c,6d,6e and 6f). However, this operation is similar to the above-mentioned embodiment in the point that the third color (red) of the liquid dispersion medium 8 is not directly displayed but the color displayed on the pixel electrode side is a color produced by reflecting the colors of the first particles 7a and the second colors 7b on the third color.

First of all, in the case of intending to display dark red, the application voltages are controlled so as to satisfy the following expression by the voltage applying unit:

$$Vc<VA<Vd=Ve=Vf \qquad \text{(Expression 9)}$$

By such a setting, it is possible to move the white particles (the first particles 7a) and the black particles (the second particles 7b) so as to be disposed on the sub-electrodes 6c, 6d, 6e, and 6f on the pixel electrode 5 side, as shown in FIG. 9A. That is, it is possible to make the black strongly influence on the color (red) of the liquid dispersion medium 8 and thus it is possible to display dark red by controlling the distribution state of the white particles (the first particles 7a) and the black particles (the second particles 7b) on the pixel electrode 5 side in a manner such that the black particles dominate a larger area.

In the case of intending to display mid-tone red, application voltages are controlled so as to satisfy the following expression by the voltage applying unit:

$$Vc=Vd<VA<Ve=Ve \qquad \text{(Expression 10)}$$

By such a setting, it is possible to move the white particles (the first particles 7a) and the black particles (the second particles 7b) in a manner shown in FIG. 9B. That is, it is possible to make the black and the white to equally influence on the color (red) of the liquid dispersion medium 8 and thus it is possible to display the mid-tone red by controlling the distribution state of the white particles (the first particles 9a) and the black particles (the second particles 7b) so as for the white particles (the first particles 7a) and the black particles (the second particles 7b) to dominate the same area.

When intending to display bright red, the potentials are controlled so as to satisfy the following expression by the voltage applying unit:

$$Vc=Vd=Ve<VA<Vf \qquad \text{(Expression 11)}$$

With such a setting, it is possible to make the white particles (the first particles 7a) and the black particles (the second particles 7b) move in a manner shown in FIG. 9C. That is, the distribution of the white particles (the first particles 7a) and the black particles (the second particles 7b) is controlled so as for the white particles to dominate a larger area and thus the white particles more strongly influence on the color (red) of the liquid dispersion medium 8. As a result, it is possible to display bright red.

In the electro-optical panel having the above-mentioned structure, when intending to display a color based on the third color of the liquid dispersion medium 8, if the brightness (grayscale) and the color phase are set to be three kinds instead of two kinds, the display characteristic is more improved.

Since all the sub-electrodes 6c, 6d, 6e, and 6f have the same area, it is possible to aromatically change the occupation areas of the first particles 7a and the second particles 7b. Accordingly, if colors of the two kinds of particles are set to be colors having different brightnesses, that is, the colors are set to be black and white, when producing the grayscale using the first particles 7a and the second particles 7b, the grayscale can be arithmetically produced.

Accordingly, this electro-optical panel also has high display flexibility and good display characteristic.

In the second embodiment, each pixel electrode 5 includes four sub-electrodes, but may include three, five, or more sub-electrodes. If the number of sub-electrodes is five or more, more steps of brightness (more levels of grayscale) or more color phases can be displayed (expressed) on the basis of the third color of the liquid dispersion medium 8.

In the second embodiment, each pixel 5 is composed of sub-electrodes having the same area. However, the pixel electrode may be composed of sub-electrodes having different areas as in the first embodiment even in the case in which each pixel electrode 5 is composed of three or more sub-electrodes. In such a case, an area ratio of the sub-electrodes may be set to be a geometric ratio, such as 1:2:4:8. Accordingly, when it is trying to display a color on the basis of the third color of the liquid dispersion medium 8, it is possible to display (express) brightness and color phase in many steps.

In the second embodiment, one sub-electrode of the two sub-electrodes is masked by the black matrix, or the like. Accordingly, it is possible to prevent the color of one kind of particles from influencing on the displayed color when it is trying to display a color which is based on the third color of the liquid dispersion medium 8.

In the above embodiments, the first substrate 2 functions as the displaying side but the invention is not limited thereto. That is, the second substrate 3 can be the displaying side by employing the second substrate 3 and the pixel electrodes 5 (the sub-electrodes 6a and 6b) which are transparent. In this case, it is possible to display the color of only one kind of particles by masking some sub-pixels by the black matrix.

Next, as applications of the invention, electronic apparatuses each employing the electro-optical panel (electro-optical device) will be described.

Next, examples of the electronic apparatus employing the electro-optical panel (electro-optical device) will be described.

Mobile Type Computer

Figure 10:
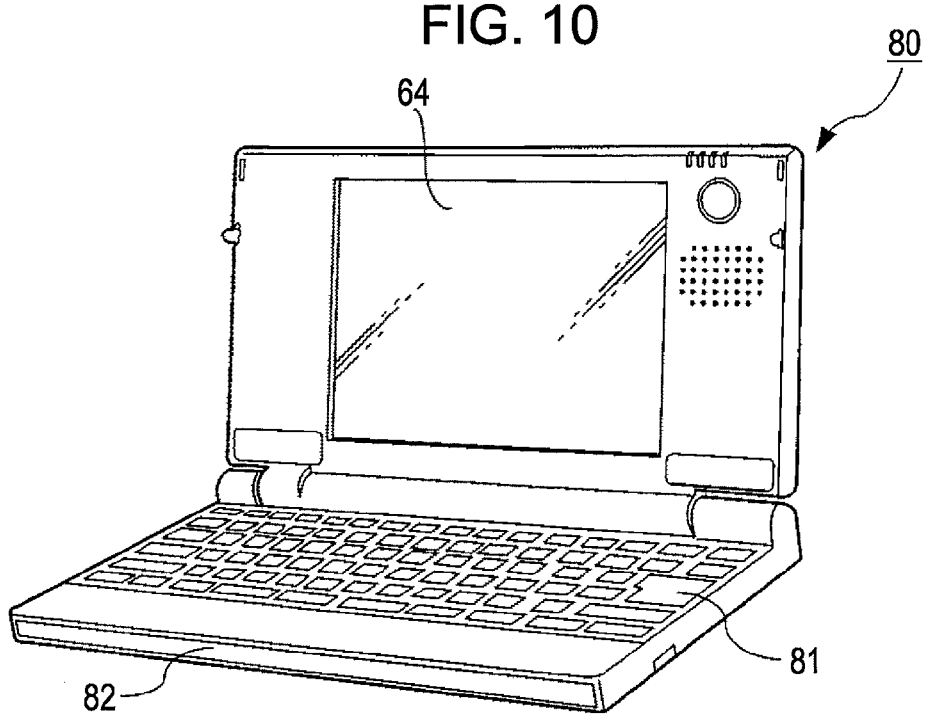
FIG. 10 is a perspective view illustrating appearance of a computer according to the invention.

First, an example in which the electro-optical panel is applied to a mobile type personal computer will be described. FIG. 10 shows a structure of the personal computer. As shown in FIG. 10, the personal computer 80 includes a main body 82 employing a keyboard 81, and a display unit employing the electro-optical panel 64.

Cellular Phone

Figure 11:
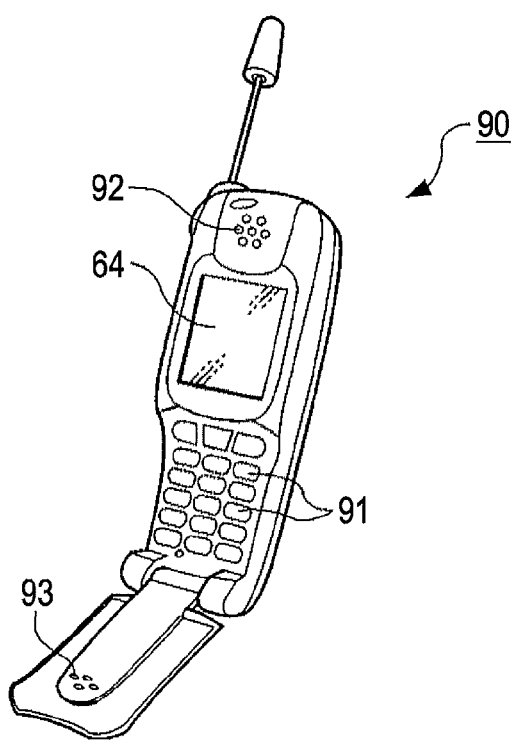
FIG. 11 is a perspective view illustrating appearance of a cellular phone according to the invention.

Next, an example, in which the electro-optical panel is applied to a display unit of a cellular phone, will be described. FIG. 11 shows a structure of the cellular phone. As shown in FIG. 11, the cellular phone 90 has a plurality of manipulation buttons 91 and also employs a receiver hole 92, a transmitter hole 93, and the electro-optical panel 64.

Electronic Paper

Figure 12:
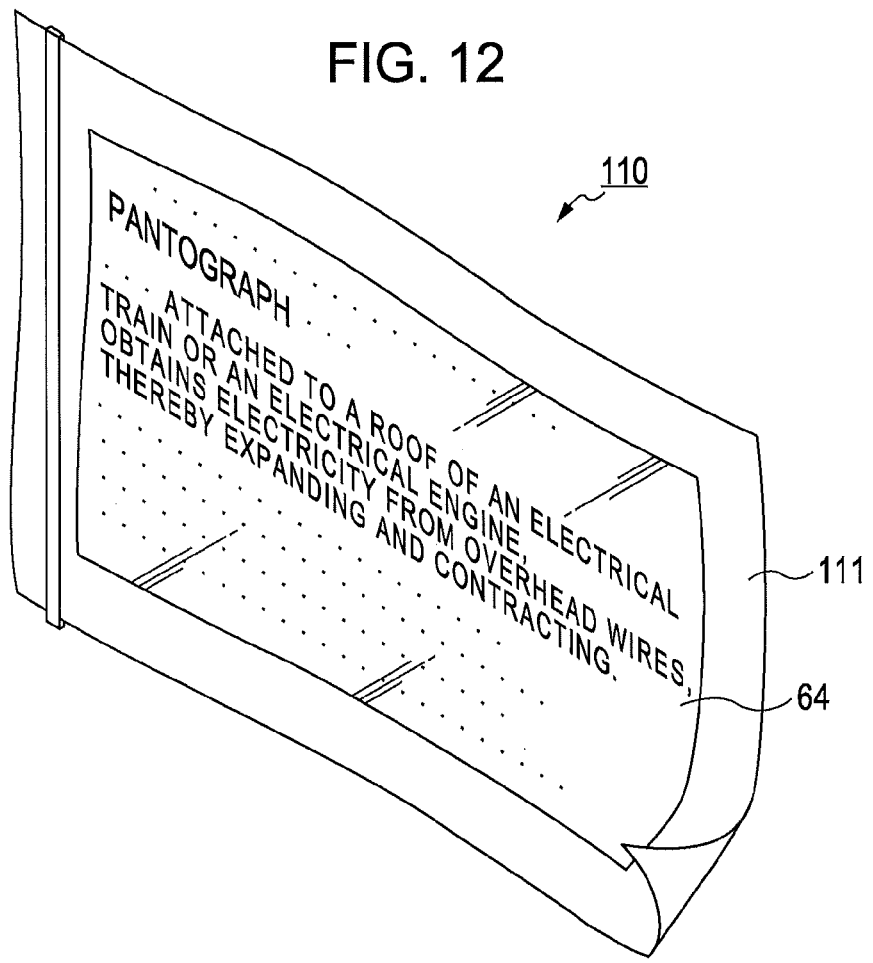
FIG. 12 is a perspective view illustrating appearance of an electronic paper according to the invention.

Next, an example, in which the electro-optical panel is applied to a display unit of electronic paper, will be described. FIG. 12 shows appearance of the electronic paper. The electronic paper 110 includes a main body 111 formed of a rewritable sheet having texture and flexibility like paper and a display unit employing the electro-optical panel 64.

Electronic Notebook

Figure 13:
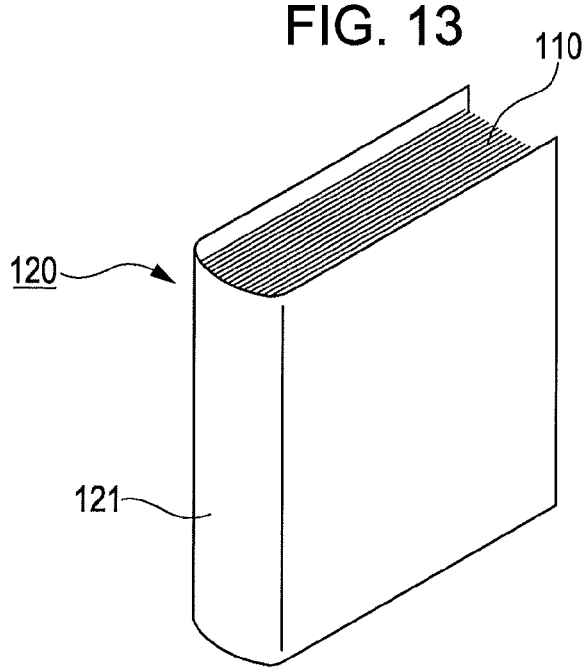
FIG. 13 is a perspective view illustrating appearance of an electronic notebook according to the invention.

FIG. 13 shows appearance of an electronic notebook. As shown in FIG. 13, the electronic notebook 120 is a bunch of a plurality of pieces of electronic paper 110 shown in FIG. 12. The bunch is the plurality of pieces of the electronic paper 110 is interposed between covers 121. By using a display data input unit provided on the cover 121, it is possible to change display contents of the electronic paper in the state of being bunched.

Since the electronic apparatus employs the electro-optical device having high display flexibility which results in good display characteristic, the display unit of the electronic apparatus, which is constructed by using the electro-optical panel, has good display characteristic.

In addition to the personal compute shown in FIG. 10, the cellular phone shown in FIG. 11, the electronic paper shown in FIG. 12, and the electronic notebook shown in FIG. 13, examples of the electronic apparatus may include an IC card having the electro-optical panel or the electro-optical device in a display unit thereof and a fingerprint sensor, an electronic book, a viewfinder type or a monitor type video recorder, a car navigation device, a pager, an electronic organizer, a calculator, a word processor, a workstation, a video conferencing phone, a POS terminal, and an apparatus with a touch panel.

What is claimed is:

1. An electro-optical panel, comprising:
   a first substrate;
   a second substrate facing the first substrate;
   a common electrode disposed on the first substrate;
   a plurality of pixel electrodes disposed on the second substrate; and
   a liquid dispersion medium which is sealed between a pair of substrates including the first substrate and the second substrate and into which charged particles are dispersed, wherein the charged particles include first particles having a first color and second particles having a second color and having been charged to have a polarity different from a polarity of the first particles, the liquid dispersion medium has a third color, each of the plurality of pixel electrodes includes a plurality of sub-electrodes, a voltage applying unit is provided so as to individually apply a voltage to the plurality of sub-electrodes, and the liquid dispersion medium has a transparency that is set so that at least the first color of the first particles on the pixel electrode side of the liquid dispersion medium is reflected toward the common electrode side.

2. The electro-optical panel according to claim 1, wherein each of the plurality of pixel electrodes includes two sub-electrodes having different areas.

3. The electro-optical panel according to claim 2, wherein a first masking portion, which hides a display attributable to one sub-electrode having a smaller area of the two sub-electrodes from view, is disposed at a portion on a displaying side, the portion corresponding to the sub-electrode having a smaller area.

4. The electro-optical panel according to claim 2, wherein the two sub-electrodes are a first sub-electrode having a rectangular shape and a second sub-electrode having a rectangular shape surrounding the first sub-electrode, a second masking portion, which hides a display attributable to the second sub-electrode from view is disposed at a portion corresponding to the second sub-electrode, and the second masking portion is formed of a black matrix disposed at a position corresponding to an empty space between the plurality of pixel electrodes.

5. The electro-optical panel according to claim 1, wherein each pixel electrode includes three or more sub-electrodes.

6. The electro-optical panel according to claim 5, wherein the three or more sub-electrodes have the same area.

7. An electro-optical device comprising the electro-optical panel according to claim 1.

8. A driving method of an electro-optical device including a first substrate, a second substrate facing the first substrate, a common electrode disposed on the first substrate, a plurality of pixel electrodes disposed on the second substrate, and a liquid dispersion medium which is sealed between a pair of substrates including the first substrate and the second substrate and into which charged particles are dispersed, in which wherein the charged particles include first particles having a first color and second particles having a second color and having been charged to have a polarity different from a polarity of the first particles, the liquid dispersion medium has a third color, each of the plurality of pixel electrodes includes a plurality of sub-electrodes, a voltage applying unit is provided so as to individually apply a voltage to the plurality of sub-electrodes, and the liquid dispersion medium has a transparency that is set so that at least the first color of the first particles on the pixel electrode side of the liquid dispersion medium is reflected toward the common electrode side, wherein the voltage applying unit is controlled so as for both the first particles and the second particles to be located close to either the common electrode or the plurality of sub-electrodes, or to be located to close to different sides, respectively.

* * * * *